(12) United States Patent
Sakaguchi et al.

(10) Patent No.: US 7,980,949 B2
(45) Date of Patent: Jul. 19, 2011

(54) GUARD CONDITION SYSTEM

(75) Inventors: Hironobu Sakaguchi, Honolulu, HI (US); Eiichiro Ishige, Tokyo (JP)

(73) Assignee: Microsoft Corporation, Redmond, WA (US)

(*) Notice: Subject to any disclaimer, the term of this patent is extended or adjusted under 35 U.S.C. 154(b) by 483 days.

(21) Appl. No.: 11/221,789

(22) Filed: Sep. 9, 2005

(65) Prior Publication Data

US 2007/0060232 A1    Mar. 15, 2007

(51) Int. Cl.
*A63F 13/10* (2006.01)
(52) U.S. Cl. .......................................................... 463/30
(58) Field of Classification Search .................. 273/236, 273/242, 243, 255; 463/9, 14, 30–32, 41–42, 463/1; 434/11; 89/11
See application file for complete search history.

(56) References Cited

U.S. PATENT DOCUMENTS

| | | | |
|---|---|---|---|
| 5,941,708 A * | 8/1999 | FitzGerald | 434/16 |
| 6,419,584 B1 * | 7/2002 | Sakamoto et al. | 463/43 |
| 6,729,954 B2 * | 5/2004 | Atsumi et al. | 463/7 |
| 2002/0045470 A1 * | 4/2002 | Atsumi et al. | 463/1 |
| 2005/0119050 A1 * | 6/2005 | Suzuki | 463/36 |
| 2006/0100020 A1 * | 5/2006 | Kasai | 463/42 |
| 2006/0287027 A1 * | 12/2006 | Hardisty et al. | 463/8 |

OTHER PUBLICATIONS

Madden NFL 2004 Review, GameZone.com, http://xbox.gamezone.com/gzreviews/r21821.htm.*
Madden NFL 2004 Review, GameDaily.com, http://www.gamedaily.com/madden-nfl-2004/xbox/game-reviews/2233/.*
Guides: Madden NFL 2004 Guide, IGN.com, http://guides.ign.com/guides/494890/page_41.html.*
NHL 2K2 User's Manual, SEGA, http://downloads.planetmirror.com/pub/replacementdocs/NHL_2K2_-_Manual_-_DC.pdf.*
IGN: NHL 2K2 Image, IGN.com, http://media.dreamcast.ign.com/media/017/017162/img_1301061.html.*
NHL: NHL Hitz: Pro for PS2, GameZone.com, http://ps2.gamezone.com/gamesell/p21740.htm.*
IGN: ESPN NHL 2K5 Image, IGN.com, http://media.xbox.ign.com/media/682/682935/img_2312353.html.*
IGN Madden NFL 2004 (release date), IGN.com, http://ps2.ign.com/objects/494/494890.html.*
IGN: NHL 2K2 (release date), IGN.com, http://dreamcast.ign.com/objects/017/017162.html.*
IGN: ESPN NHL 2K5 (release date), IGN.com, http://ps2.ign.com/objects/682/682938.html.*

(Continued)

*Primary Examiner* — James S. McClellan
*Assistant Examiner* — Damon J. Pierce
(74) *Attorney, Agent, or Firm* — Woodcock Washburn LLP (57) ABSTRACT

A guard condition system for determining whether to block an attack against a character in a multi-character party within an entertainment game is disclosed. A multi-character party may be divided into multiple lines of battle, such that all characters in more forward lines of battle automatically attempt to block attacks by an enemy against any characters in a more rearward line of battle. Whether a block attempt is successful may depend on a variable referred to as a guard condition value, which may be based on the characters in the multi-character party, the characters in the forward line of battler performing the blocking, and/or other modifiers resulting from the battle itself or from temporary rewards and penalties. When an attack is successful, the attacking character may move to the location of the attacked character such that subsequent attacks are immune from blocking attempts.

21 Claims, 7 Drawing Sheets

OTHER PUBLICATIONS

IGN: NHL Hit Pro (release date), IGN.com, http://ps2.ign.com/objects/545/545760.html.*
Final Fantasy VII—Game Manual—1997.*
Final Fantasy VIII—Game Manual—1999.*
Final Fantasy VII—1997 GameFaqs—http://db.gamefaqs.com/console/psx/file/final_fantasy_vii_p.txt.*
Final Fantasy Tactics, Sony Playstation, 1997.*

* cited by examiner

GUARD CONDITION SYSTEM

BACKGROUND

Computer and video games have matured from the likes of "Pong" into epic adventures having rich storylines, photorealistic graphics, and complex interaction systems, thereby allowing a player to immerse herself in the alternative reality that is emulated by the video game. As used herein, video games may include, but are not limited to, any game played on a data processing device. Examples of video games may include computer games, game console games (e.g., playable on the Xbox®, PlayStation®, and/or Nintendo® brand game consoles), coin-operated or token-operated arcade games, portable gaming device games (e.g., playable on the Nokia N-Gage®, PlayStation Portable, Nintendo DS, a mobile phone, etc.), or other software-driven games.

Video games come in many genres, such as first-person shooters (FPS), role-playing games (RPG), simulation, sports, strategy, and driving, to name a few. Each video game is not necessarily limited to a single genre, and may indeed encompass multiple genres. A RPG generally refers to a game in which each participant assumes the role of a character in the game (such as an adventurer, monster, or other player-character) that can interact within the game's virtual world. A character controlled by a player/user is referred to as a player-character (PC). A computer controlled character is referred to as a non-player-character (NPC).

RPGs use a fighting system through which PCs and NPCs engage in simulated fights and/or battles, referred to herein as character engagement. As used herein, the system used by a RPG to simulate fighting is referred to as a battle system. The battle system is typically implemented as a software module of the video game. One known battle system is a real-time battle system, whereby player-characters take actions as soon as input is received from the player, without waiting for another character to take an action. Another known battle system can be broadly referred to as a turn-based battle system. In a turn-based battle system each character performs an action in a predetermined order, such as a continuous sequential order of all player-characters and non-player-characters involved in the character engagement until the character engagement is resolved, e.g., one character or team wins.

Another type of known battle system is a party-based battle system, whereby a single player or user provides instructions for multiple characters within the same party engaged in a battle with one or more enemies. In known party-based battle systems, one character may opt to defend another character in the same party. That is, the player may instruct a first character in the party to defend a second character in the party from any enemies during a battle. In such party-based battle systems, a player must specify the character defending the second character, and the player must also choose the second character that is to be defended. However, such systems quickly become tedious to players in that each player must continuously choose and/or update characters to perform defense and those to be defended, thereby causing players to become easily frustrated. Thus, it would be an advancement in the art to provide a party-based battle system that provided an improved defense capability.

SUMMARY

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

An illustrative feature provides a party-based battle system for a video game, where a multi-character party is split among two or more lines of battle. Each line of battle has one or more of the characters from the multi-character party. During a combat scenario, party characters on one line of battle automatically attempt to block attacks by the enemy directed to party characters on more rearward lines of battle.

Another illustrative feature allows a player to define the lines of battle and/or which characters of a multi-character party are placed on each line of battle. The player may define multiple lines of battle and/or the order of the lines of battle. The user may also specify which party characters should be placed on each line of battle, thereby allowing the player to strategically control the arrangement of her multi-character party. Thus, the player can specify which characters to place on the front line of battle, and not be subject to blocks by other party characters, and which characters to place on more rearward lines of battle, thus receiving possible blocking of enemy attacks by party characters on more forward lines of battle.

Yet another illustrative feature determines whether an attacking character moves into a position in proximity with an attacked character as a result of the attack. In a video game where a player controls a multi-character party arranged into a plurality of ordered lines of battle, such as a first line of battle and a second line of battle behind the first line of battle, each party character is located in one of the lines of battle. When an attacking character attacks a party character located on the second line of battle (or any non-front line of battle), the characters on the first line of battle (or any line of battle in front of the second line of battle) may perform some action based on the attack. If the attack is successful, the attacking character may move in proximity with the attacked character such that subsequent attacks by the attacking character on the attacked character are not subject to the action performed by the characters on the first line of battle (or any line of battle in front of the second line of battle) based on the attack. If the attack is unsuccessful, the attacking character may move back to its original position, such that subsequent attacks are again subject to an action performed by the characters on the first line of battle (or any line of battle in front of the second line of battle) based on the attack.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
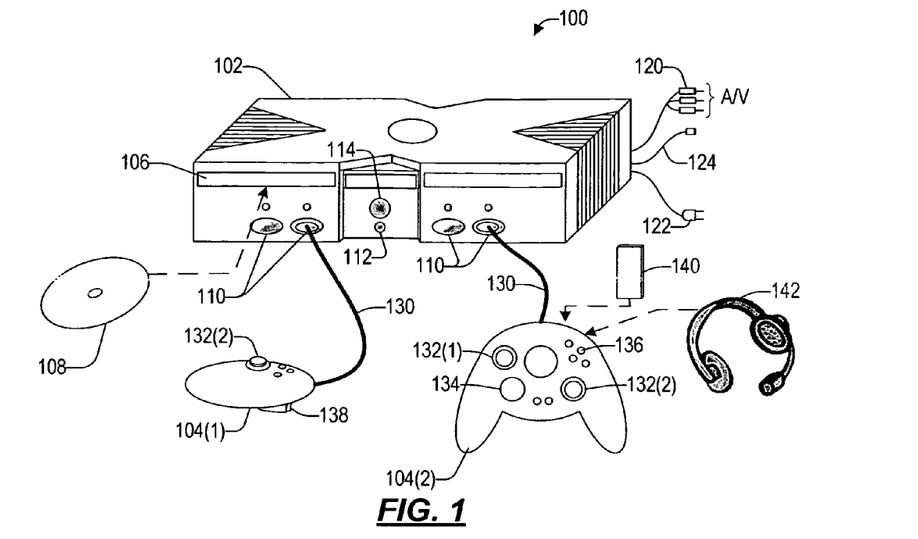
FIG. 1 illustrates a gaming system that may be used according to an illustrative feature described herein.

FIG. 1 illustrates an example of a suitable gaming system environment 100 on which video games incorporating one or more aspects of the present invention may be played. The gaming system environment 100 is only one example of a suitable computing environment and is not intended to suggest any limitation as to the scope of use or functionality of the invention. Neither should the gaming system environment 100 be interpreted as having any dependency or requirement relating to any one or combination of components illustrated in the illustrative operating gaming system environment 100.

The invention is operational with numerous other general purpose or special purpose computing system environments or configurations. Examples of well known computing systems, environments, and/or configurations that may be suitable for use with the invention include, but are not limited to, personal computers; server computers; portable and handheld devices such as personal digital assistants (PDAs), tablet PCs or laptop PCs; multiprocessor systems; microprocessor-based systems; set top boxes; programmable consumer electronics; network PCs; minicomputers; mainframe computers; electronic game consoles, distributed computing environments that include any of the above systems or devices; and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

FIG. 1 shows an exemplary gaming system 100. Gaming system 100 may include a game console 102 and up to four controllers, as represented by controllers 104(1) and 104(2). The game console 102 is equipped with an internal hard disk drive and a portable media drive 106 that supports various forms of portable storage media as represented by optical storage disc 108. Examples of suitable portable storage media include DVD, CD-ROM, game discs, and so forth.

Game console 102 has four slots 110 on its front face to support up to four controllers, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the storage disc 108.

Game console 102 may connect to a television or other display (not shown) via A/V interfacing cables 120. The display (not shown) may be referred to herein as a video game display device. A power cable 122 provides power to the game console. Game console 102 may further be configured with broadband network capabilities, as represented by the cable or modem connector 124 to facilitate access to a network, such as the Internet.

Each controller 104 may be coupled to the game console 102 via a wire or wireless interface. In the illustrated implementation, the controllers are USB (Universal Serial Bus) compatible and are connected to the console 102 via USB cables 130. Controller 102 may be equipped with any of a wide variety of user interaction mechanisms. As illustrated in FIG. 1, each controller 104 is equipped with two thumbsticks 132(1) and 132(2), a D-pad 134, buttons 136 (e.g., 'A', 'B', 'X', 'Y'), and two triggers 138. These mechanisms are merely representative, and other known gaming mechanisms may be substituted for or added to those shown in FIG. 1.

A memory unit (MU) 140 may be inserted into the controller 104 to provide additional and portable storage. Portable memory units enable users to store game parameters and user accounts, and port them for play on other consoles. In the described implementation, each controller is configured to accommodate two memory units 140, although more or less than two units may be employed in other implementations. A headset 142 may be connected to the controller 104 or game console 102 to provide audio communication capabilities. Headset 142 may include a microphone for audio input and one or more speakers for audio output.

Gaming system 100 is capable of playing, for example, games, music, and videos. With the different storage offerings, titles can be played from the hard disk drive or the portable medium 108 in drive 106, from an online source, or from a memory unit 140. For security, in some embodiments executable code can only be run from the portable medium 108. A sample of what gaming system 100 is capable of playing include game titles played from CD and DVD discs, from the hard disk drive, or from an online source; digital music played from a CD in the portable media drive 106, from a file on the hard disk drive (e.g., Windows Media Audio (WMA) format), or from online streaming sources; and digital audio/video played from a DVD disc in the portable media drive 106, from a file on the hard disk drive (e.g., Active Streaming Format), or from online streaming sources.

Figure 2:
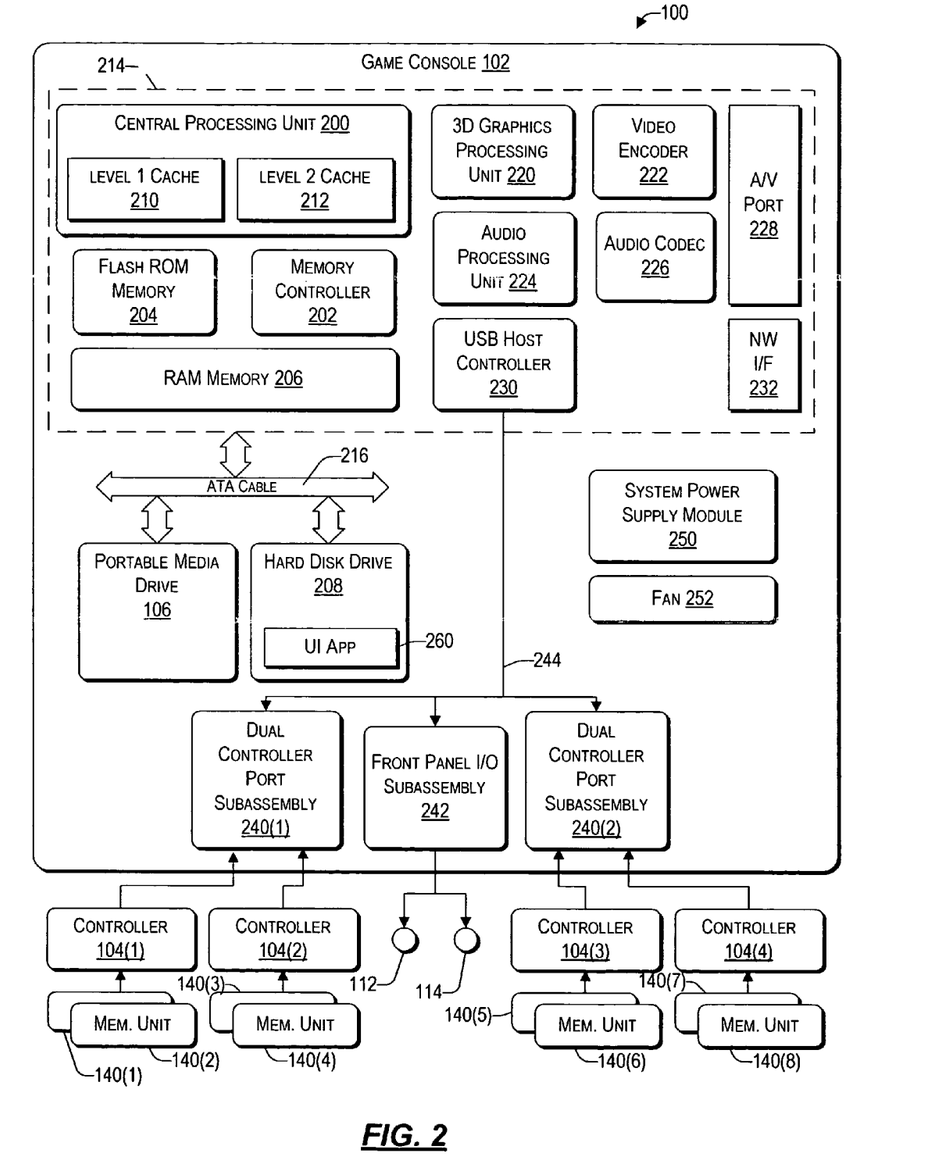
FIG. 2 illustrates a block diagram of the gaming system shown in FIG. 1.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

As one suitable implementation, the CPU 200, memory controller 202, ROM 204, and RAM 206 are integrated onto a common module 214. In this implementation, ROM 204 is configured as a flash ROM that is connected to the memory controller 202 and a ROM bus (not shown). RAM 206 is configured as multiple DDR SDRAM (Double Data Rate Synchronous Dynamic RAM) that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)-104(4). The network interface 232 provides access to a network (e.g., Internet, home network, etc.) and may be any of a wide variety of various wire or wireless interface components including an Ethernet card, a modem, a Bluetooth module, a cable modem, and the like.

The game console 102 has two dual controller support subassemblies 240(1) and 240(2), with each subassembly supporting two game controllers 104(1)-104(4). A front panel I/O subassembly 242 supports the functionality of the power button 112 and the eject button 114, as well as any LEDs (light emitting diodes) or other indicators exposed on the outer surface of the game console. The subassemblies 240(1), 240(2), and 242 are coupled to the module 214 via one or more cable assemblies 244.

Eight memory units 140(1)-140(8) are illustrated as being connectable to the four controllers 104(1)-104(4), i.e., two memory units for each controller. Each memory unit 140 offers additional storage on which games, game parameters, and other data may be stored. When inserted into a controller, the memory unit 140 can be accessed by the memory controller 202.

A system power supply module 250 provides power to the components of the gaming system 100. A fan 252 cools the circuitry within the game console 102.

The game console 102 implements a uniform media portal model that provides a consistent user interface and navigation hierarchy to move users through various entertainment areas. The portal model offers a convenient way to access content from multiple different media types—game data, audio data, and video data—regardless of the media type inserted into the portable media drive 106.

To implement the uniform media portal model, a console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console.

The gaming system 100 may be operated as a standalone system by simply connecting the system to a television or other display. In this standalone mode, the gaming system 100 allows one or more players to play games, watch movies, or listen to music. However, with the integration of broadband connectivity made available through the network interface 232, the gaming system 100 may further be operated as a participant in a larger network gaming community. This network gaming environment is described next.

Figure 3:
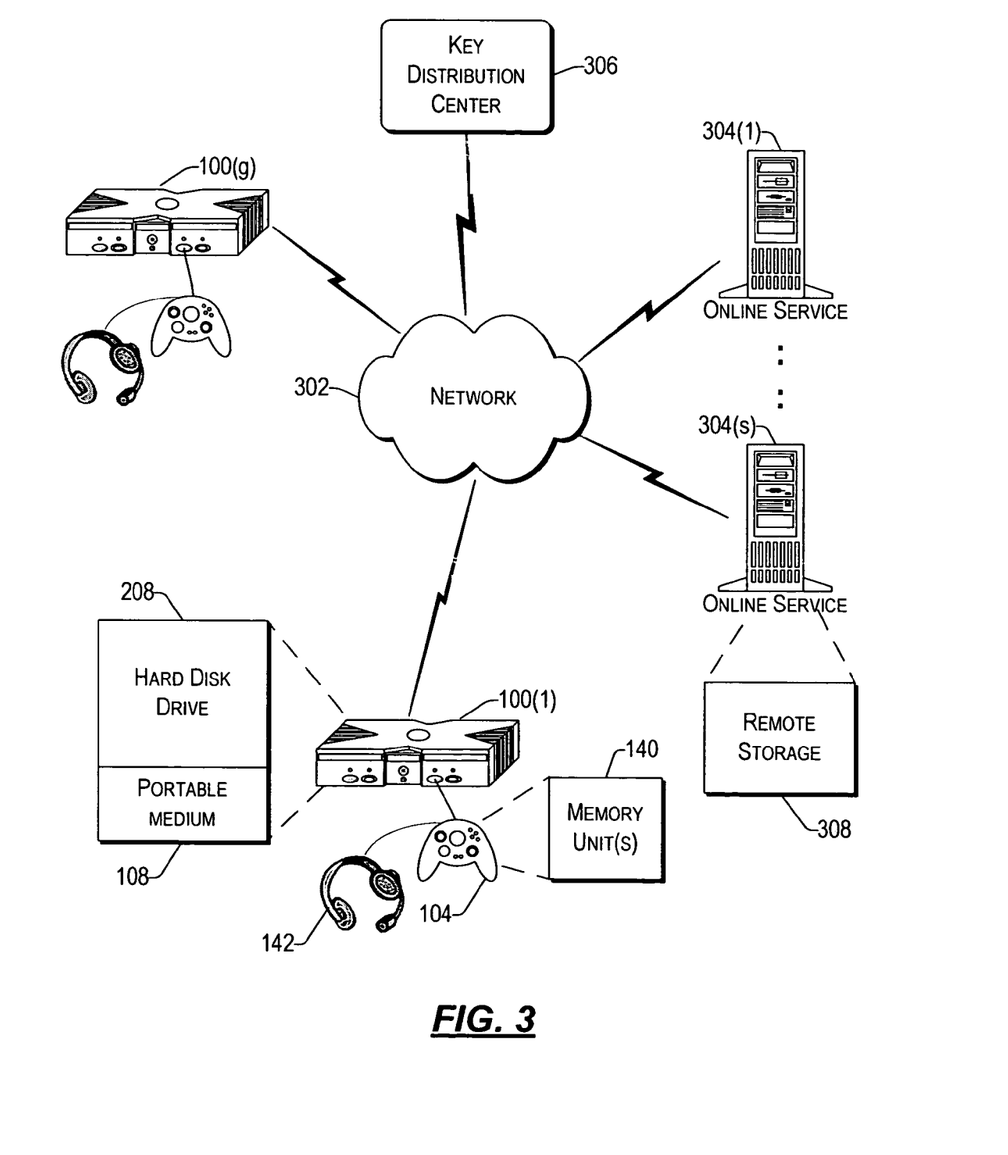
FIG. 3 illustrates a block diagram of a network gaming system according to an illustrative feature described herein.

FIG. 3 shows an exemplary network gaming environment 300 that interconnects multiple gaming systems 100(1), ..., 100(g) via a network 302. The network 302 represents any of a wide variety of data communications networks. It may include public portions (e.g., the Internet) as well as private portions (e.g., a residential Local Area Network (LAN)), as well as combinations of public and private portions. Network 302 may be implemented using any one or more of a wide variety of conventional communications media including both wired and wireless media. Any of a wide variety of communications protocols can be used to communicate data via network 302, including both public and proprietary protocols. Examples of such protocols include TCP/IP, IPX/SPX, NetBEUI, etc.

In addition to gaming systems 100, one or more online services 304(1), ..., 304(s) may be accessible via the network 302 to provide various services for the participants, such as hosting online games, serving downloadable music or video files, hosting gaming competitions, serving streaming audio/video files, and the like. The network gaming environment 300 may further involve a key distribution center 306 that plays a role in authenticating individual players and/or gaming systems 100 to one another as well as online services 304. The distribution center 306 distributes keys and service tickets to valid participants that may then be used to form games amongst multiple players or to purchase services from the online services 304.

The network gaming environment 300 introduces another memory source available to individual gaming systems 100—online storage. In addition to the portable storage medium 108, the hard disk drive 208, and the memory unit(s) 140, the gaming system 100(1) can also access data files available at remote storage locations via the network 302, as exemplified by remote storage 308 at online service 304(s).

Figure 4:
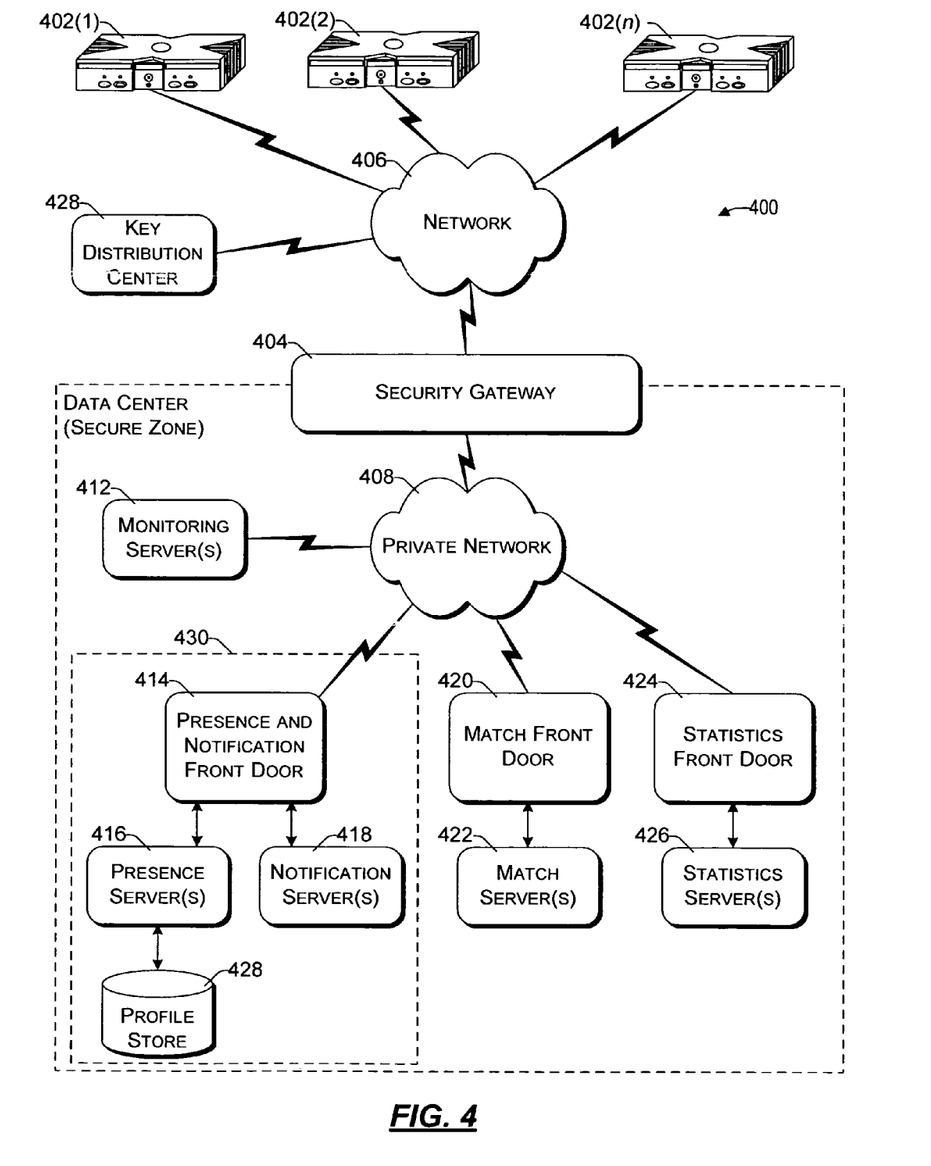
FIG. 4 illustrates another block diagram of an online gaming environment according to an illustrative feature described herein.

FIG. 4 is a block diagram of another illustrative online gaming environment 400, e.g. XBOX®LIVE by Microsoft Corporation of Redmond, Wash. Multiple game consoles 402(1), 402(2), ..., 402(n) are coupled to a security gateway 404 via a network 406. Each game console 402 can be, for example, a game console 102 of FIG. 1 or FIG. 2. Network 406 represents any one or more of a variety of conventional data communications networks. Network 406 will typically include packet switched networks, but may also include circuit switched networks. Network 406 can include wire and/or wireless portions. In one exemplary implementation, network 406 includes the Internet and may optionally include one or more local area networks (LANs) and/or wide area networks (WANs). At least a part of network 406 is a public network, which refers to a network that is publicly-accessible. Virtually anyone can access the public network.

In some situations, network 406 includes a LAN (e.g., a home network), with a routing device situated between game console 402 and security gateway 404. This routing device may perform network address translation (NAT), allowing the multiple devices on the LAN to share the same IP address on the Internet, and also operating as a firewall to protect the device(s) on the LAN from access by malicious or mischievous users via the Internet.

Security gateway 404 operates as a gateway between public network 406 and a private network 408. Private network 408 can be any of a wide variety of conventional networks, such as a local area network. Private network 408, as well as other devices discussed in more detail below, is within a data center 410 that operates as a secure zone. Data center 410 is made up of trusted devices communicating via trusted communications. Thus, encryption and authentication within secure zone 410 is not necessary. The private nature of network 408 refers to the restricted accessibility of network 408—access to network 408 is restricted to only certain individuals (e.g., restricted by the owner or operator of data center 410).

Security gateway 404 is a cluster of one or more security gateway computing devices. These security gateway computing devices collectively implement security gateway 404. Security gateway 404 may optionally include one or more conventional load balancing devices that operate to direct requests to be handled by the security gateway computing devices to appropriate ones of those computing devices. This directing or load balancing is performed in a manner that attempts to balance the load on the various security gateway computing devices approximately equally (or alternatively in accordance with some other criteria).

Also within data center 410 are: one or more monitoring servers 412; one or more presence and notification front doors 414, one or more presence servers 416, one or more notification servers 418, and a profile store 428 (collectively implementing a presence and notification service or system 430); one or more match front doors 420 and one or more match servers 422 (collectively implementing a match service); and one or more statistics front doors 424 and one or more statistics servers 426 (collectively implementing a statistics service). The servers 416, 418, 422, and 426 provide services to game consoles 402, and thus can be referred to as service devices. Other service devices may also be included in addition to, and/or in place of, one or more of the servers 416, 418, 422, and 426. Additionally, although only one data center is shown in FIG. 4, alternatively multiple data centers may exist with which game consoles 402 can communicate. These data centers may operate independently, or alternatively may operate collectively (e.g., to make one large data center available to game consoles 102, 402).

Game consoles 402 are situated remotely from data center 410, and access data center 410 via network 406. A game console 402 desiring to communicate with one or more devices in the data center logs in to the data center and establishes a secure communication channel between the console 402 and security gateway 404. Game console 402 and security gateway 404 encrypt and authenticate data packets being passed back and forth, thereby allowing the data packets to be securely transmitted between them without being understood by any other device that may capture or copy the data packets without breaking the encryption. Each data packet communicated from game console 402 to security gateway 404, or from security gateway 404 to game console 402 can have data embedded therein. This embedded data is referred to as the content or data content of the packet. Additional information may also be inherently included in the packet based on the packet type (e.g., a heartbeat packet).

The secure communication channel between a console 402 and security gateway 404 is based on a security ticket. Console 402 authenticates itself and the current user(s) of console 402 to a key distribution center 428 and obtains, from key distribution center 428, a security ticket. Console 402 then uses this security ticket to establish the secure communication channel with security gateway 404. In establishing the secure communication channel with security gateway 404, the game console 402 and security gateway 404 authenticate themselves to one another and establish a session security key that is known only to that particular game console 402 and the security gateway 404. This session security key is used to encrypt data transferred between the game console 402 and the security gateway cluster 404, so no other devices (including other game consoles 402) can read the data. The session security key is also used to authenticate a data packet as being from the security gateway 404 or game console 402 that the data packet alleges to be from. Thus, using such session security keys, secure communication channels can be established between the security gateway 404 and the various game consoles 402.

Once the secure communication channel is established between a game console 402 and the security gateway 404, encrypted data packets can be securely transmitted between the two. When the game console 402 desires to send data to a particular service device in data center 410, the game console 402 encrypts the data and sends it to security gateway 404 requesting that it be forwarded to the particular service device(s) targeted by the data packet. Security gateway 404 receives the data packet and, after authenticating and decrypting the data packet, encapsulates the data content of the packet into another message to be sent to the appropriate service via private network 408. Security gateway 404 determines the appropriate service for the message based on the requested service(s) targeted by the data packet.

Similarly, when a service device in data center 410 desires to communicate data to a game console 402, the data center sends a message to security gateway 404, via private network 408, including the data content to be sent to the game console 402 as well as an indication of the particular game console 402 to which the data content is to be sent. Security gateway 404 embeds the data content into a data packet, and then encrypts the data packet so it can only be decrypted by the particular game console 402 and also authenticates the data packet as being from the security gateway 404.

Although discussed herein as primarily communicating encrypted data packets between security gateway 404 and a game console 402, alternatively some data packets may be partially encrypted (some portions of the data packets are encrypted while other portions are not encrypted). Which portions of the data packets are encrypted and which are not can vary based on the desires of the designers of data center 410 and/or game consoles 402. For example, the designers may choose to allow voice data to be communicated among consoles 402 so that users of the consoles 402 can talk to one another—the designers may further choose to allow the voice data to be unencrypted while any other data in the packets is encrypted. Additionally, in another alternative, some data packets may have no portions that are encrypted (that is, the entire data packet is unencrypted). It should be noted that, even if a data packet is unencrypted or only partially encrypted, all of the data packet can still be authenticated.

Each security gateway device in security gateway 404 is responsible for the secure communication channel with typically one or more game consoles 402, and thus each security gateway device can be viewed as being responsible for managing or handling one or more game consoles. The various security gateway devices may be in communication with each other and communicate messages to one another. For example, a security gateway device that needs to send a data packet to a game console that it is not responsible for managing may send a message to all the other security gateway devices with the data to be sent to that game console. This message is received by the security gateway device that is responsible for managing that game console and sends the appropriate data to that game console. Alternatively, the security gateway devices may be aware of which game consoles are being handled by which security gateway devices—this may be explicit, such as each security gateway device maintaining a table of game consoles handled by the other security gateway devices, or alternatively implicit, such as determining which security gateway device is responsible for a particular game console based on an identifier of the game console.

Monitoring server(s) 412 operate to inform devices in data center 410 of an unavailable game console 402 or an unavailable security gateway device of security gateway 404. Game consoles 402 can become unavailable for a variety of different reasons, such as a hardware or software failure, the console being powered-down without logging out of data center 410, the network connection cable to console 402 being disconnected from console 402, other network problems (e.g., the LAN that the console 402 is on malfunctioning), etc. Similarly, a security gateway device of security gateway 404 can become unavailable for a variety of different reasons, such as hardware or software failure, the device being powered-down, the network connection cable to the device being disconnected from the device, other network problems, etc.

Each of the security gateway devices in security gateway 404 is monitored by one or more monitoring servers 412, which detect when one of the security gateway devices becomes unavailable. In the event a security gateway device becomes unavailable, monitoring server 412 sends a message to each of the other devices in data center 410 (servers, front doors, etc.) that the security gateway device is no longer available. Each of the other devices can operate based on this information as it sees fit (e.g., it may assume that particular game consoles being managed by the security gateway device are no longer in communication with data center 410 and perform various clean-up operations accordingly). Alternatively, only certain devices may receive such a message from the monitoring server 412 (e.g., only those devices that are concerned with whether security gateway devices are available).

Security gateway 404 monitors the individual game consoles 402 and detects when one of the game consoles 402 becomes unavailable. When security gateway 404 detects that a game console is no longer available, security gateway 404 sends a message to monitoring server 412 identifying the unavailable game console. In response, monitoring server 412 sends a message to each of the other devices in data center 410 (or alternatively only selected devices) that the game console is no longer available. Each of the other devices can then operate based on this information as it sees fit.

Presence server(s) 416 hold and process data concerning the status or presence of a given user logged in to data center 410 for online gaming. Notification server(s) 418 maintains multiple notification queues of outgoing messages destined for a player logged in to data center 410. Presence and notification front door 414 is one or more server devices that operate as an intermediary between security gateway 404 and servers 416 and 418. One or more load balancing devices (not shown) may be included in presence and notification front door 414 to balance the load among the multiple server devices operating as front door 414. Security gateway 404 communicates messages for servers 416 and 418 to the front door 414, and the front door 414 identifies which particular server 416 or particular server 418 the message is to be communicated to. By using front door 414, the actual implementation of servers 416 and 418, such as which servers are responsible for managing data regarding which users, is abstracted from security gateway 404. Security gateway 404 can simply forward messages that target the presence and notification service to presence and notification front door 414 and rely on front door 414 to route the messages to the appropriate one of server(s) 416 and server(s) 418.

Match server(s) 422 hold and process data concerning the matching of online players to one another. An online user is able to advertise a game available for play along with various characteristics of the game (e.g., the location where a football game will be played, whether a game is to be played during the day or at night, the user's skill level, etc.). These various characteristics can then be used as a basis to match up different online users to play games together. Match front door 420 includes one or more server devices (and optionally a load balancing device(s)) and operates to abstract match server(s) 422 from security gateway 404 in a manner analogous to front door 414 abstracting server(s) 416 and server(s) 418.

Statistics server(s) 426 hold and process data concerning various statistics for online games. The specific statistics used can vary based on the game designer's desires (e.g., the top ten scores or times, a world ranking for all online players of the game, a list of users who have found the most items or spent the most time playing, etc.). Statistics front door 426 includes one or more server devices (and optionally a load balancing device(s)) and operates to abstract statistics server(s) 426 from security gateway 404 in a manner analogous to front door 414 abstracting server(s) 416 and server(s) 418.

Thus, it can be seen that security gateway 404 operates to shield devices in the secure zone of data center 410 from the untrusted, public network 406. Communications within the secure zone of data center 410 need not be encrypted, as all devices within data center 410 are trusted. However, any information to be communicated from a device within data center 410 to a game console 402 passes through security gateway cluster 404, where it is encrypted in such a manner that it can be decrypted by only the game console 402 targeted by the information.

One or more aspects of the invention may be embodied in computer-executable instructions (i.e., software) stored in RAM memory 206, non-volatile memory 108, 208, 308, or any other resident memory on game console 102. Generally, software modules include routines, programs, objects, components, data structures, etc. that perform particular tasks or implement particular abstract data types when executed by a processor in a computer or other device. The computer executable instructions may be stored on a computer readable medium such as a hard disk 208, removable storage media 108, solid state memory, RAM 206, etc. As will be appreciated by one of skill in the art, the functionality of the software modules may be combined or distributed as desired in various embodiments. In addition, the functionality may be embodied in whole or in part in firmware or hardware equivalents such as application specific integrated circuits (ASIC), field programmable gate arrays (FPGA), and the like.

Figure 5:
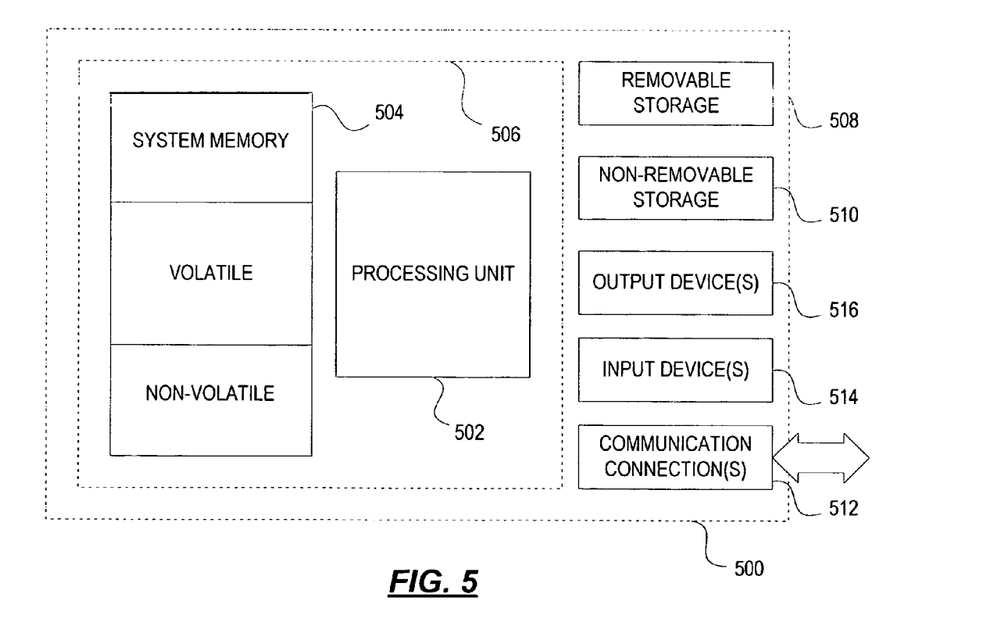
FIG. 5 illustrates a block diagram of a general purpose data processing device that may be used according to one or more illustrative features described herein.

One or more aspects of the invention may also or alternatively be implemented in a general purpose computer or other data processing device, such as is illustrated generally in FIG. 5. With reference to FIG. 5, an illustrative system for implementing the invention includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 5 by dashed line 506. Additionally, device 500 may also have additional features/functionality. For example, device 500 may also include additional storage (removable and/or non-removable) including, but not limited to, magnetic or optical disks or tape. Such additional storage is illustrated in FIG. 5 by removable storage 508 and non-removable storage 510. Computer storage media includes volatile and nonvolatile, removable and non-removable media implemented in any method or technology for storage of information such as computer readable instructions, data structures, program modules or other data instructing a device to operate as described herein. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Device 500 may also contain communications connection(s) 512 that allow the device to communicate with other devices. Communications connection(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 500 may also have input device(s) 514 such as keyboard, mouse, pen, voice input device, touch input device, etc. Output device(s) 516 such as a display, speakers, printer, etc. may also be included. All these devices are well know in the art and need not be discussed at length here.

Illustrative Embodiments

Guard Condition System

A video game, such as an adventure or role-playing game (RPG), may incorporate an improved party-based battle system as described herein, referred to as a Guard Condition System (GCS), according to one or more illustrative features described below. The GCS may be implemented as a software module of the video game, or via other control logic, and cause a computer, game console, or the like, to operate in conformance with the GCS. The GCS is useful in entertainment games whereby a player controls a party of multiple characters, such as in an adventure or role-playing game (RPG). Those of skill in the art will appreciate, upon reading this specification, that the GCS is not limited to use with only such games. The player may arrange the characters in a party into multiple lines of battle, where characters in more forward lines of battle automatically attempt to defend characters in more rearward lines of battle.

According to various illustrative embodiments, an entertainment game utilizing the GCS may be played as a board game where players roll dice to determine the outcome of various events and calculations as described herein. In another embodiment, a GCS may be used in a RPG entertainment game, utilizing dice with various numbers of sides, and overseen by a curator of the game, similar to the style of play in the Advanced Dungeons & Dragons® brand RPG, as overseen by a dungeon master. In yet another illustrative embodiment, the GCS may be implemented in a video game executing on a game console system, e.g., in conformance with FIGS. 1-4, or in a computer game executing on a computer system such as is illustrated in FIG. 5. Those of skill in the art will appreciate that the GCS described herein may be used in any implementation of an entertainment game with little modification necessary from one format to another.

Figure 6:
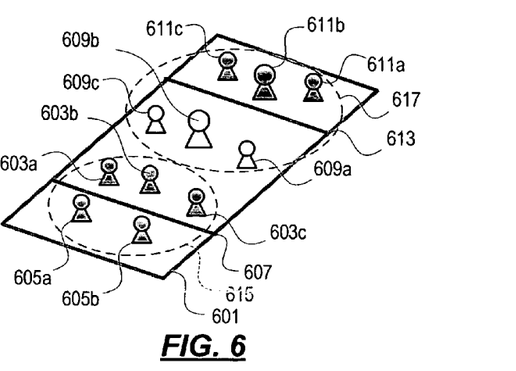
FIG. 6 illustrates a multi-character party battle arrangement where each multi-character party is arranged into two lines of battle according to an illustrative feature described herein.

FIG. 6 illustrates positioning of characters in a battle area 601 being depicted by and as part of a video game. Characters 603a, 603b, and 603c, and characters 605a and 605b make up a player party 615. Characters 609a, 609b, and 609c, and characters 611a, 611b, and 611c make up an enemy party 617. Within player party 615, characters 603a, 603b, and 603c make up the player's front line of battle, and characters 605a and 605b make up the player's rear line of battle, each line of battle separated by a defensive line 607. Thus, as described herein, the player party 615 is said to have a front line of battle 603 and a rear line of battle 605. Characters in the front line of battle may be referred to herein as front guard characters, and characters in more rearward lines of battle may be referred to herein as rear guard characters.

Within enemy party 617, characters 609a, 609b, and 609c make up an enemy front line of battle, and characters 611a, 611b, and 611c make up an enemy rear line of battle, each line of battle separated by a defensive line 613. Thus, as described herein, the enemy party 617 is said to have a front line of battle 609 and a rear line of battle 611. FIG. 6 is for illustrative purposes only, as characters, lines of battle, and defensive lines may be graphically depicted in various forms (or not at all, such as in the case of a defensive line) on a video game display device.

Figure 7:
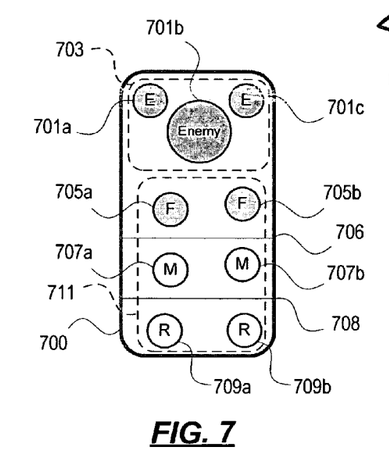
FIG. 7 illustrates a multi-character party battle arrangement where a first party has a single line of battle and a second party has three lines of battle, according to an illustrative feature described herein.

While FIG. 6 illustrates parties that each has two lines of battle, i.e., front and rear lines of battle, features described herein are not limited as such. For example, FIG. 7 illustrates a battle area 700 whereby an enemy party 703 has a single line of battle 701 consisting of characters 701a, 701b, and 701c. Player party 711 has three lines of battle: front line of battle 705 (characters 705a, 705b), middle line of battle 707 (characters 707a, 707b), and rear line of battle 709 (characters 709a, 709b). Defensive line 706 separates front line of battle 705 and middle line of battle 707, whereas defensive line 708 separates middle line of battle 707 and rear line of battle 709. Thus, any number of lines of battle per party (player and enemy) may be used. For ease of illustration and description, the examples below are provided with respect to a party having two lines of battle.

According to a feature as described herein, a first character in one line of battle may automatically defend any characters in a line of battle behind the first character's line of battle. While a character in a front line of battle may automatically defend a character in a more rearward line of battle, the defense might not always be successful, and success may be determined according to predefined criteria or functions defined in the GCS. In preparation for a battle, a player controlling a party, or the control logic of the GCS, may specify which characters are to be placed in which lines of battle of a given party. A player may thereby strategically place stronger characters or characters with better defensive capabilities (e.g., fighters) in front lines of battle, and weaker characters (e.g., healers) in rearward lines of battle.

Figure 8:
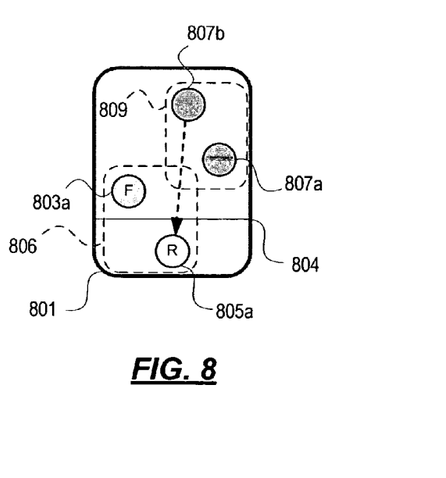
FIG. 8 illustrates an attempted attack according to an illustrative feature described herein.
Figure 9:
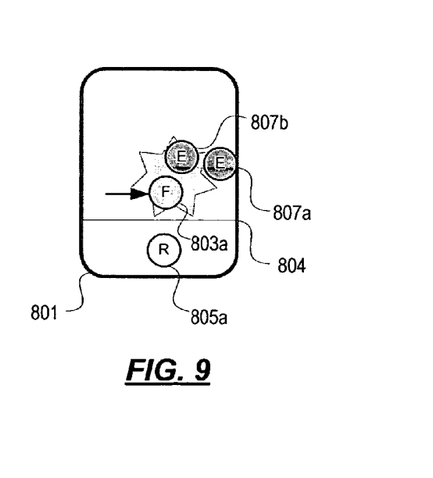
FIG. 9 illustrates a successful block of an attack according to an illustrative feature described herein.

For example, with reference to FIG. 8 and FIG. 9, a battle 801 may commence between a first party 806 (here the defending party) and a second party 809 (here the attacking party). First party 806 has a front line of battle 803 consisting of character 803*a*, and a rear line of battle 805 consisting of character 805*a*. Front line 803 and rear line 805 are separated by defensive line 804. Second party 809 consists of characters 807*a* and 807*b*. According to an illustrative feature, lines of battle might only affect defending parties, and thus the arrangement of characters 807*a* and 807*b* into lines of battle is irrelevant for purposes of this illustration because party 809 is the attacking party. FIG. 8 illustrates that character 807*b* attempts to attack character 805*a*. FIG. 9 illustrates that, based on the relationship of character 803*a* to character 805*a*, i.e., character 803*a* is in a more forward line of battle to character 805*a*, character 803*a* moves to block the attack of character 807*b*.

Defensive lines are primarily conceptual in nature and need not be included or displayed in a video game implementing a GCS battle system. The defensive lines shown in the figures are for illustrative purposes only, and need not be included on the video game display device. That is, defensive lines merely illustrate divisions between lines of battle, and establish which characters will attempt to defend other characters. According to one feature, defensive lines might be displayed during a setup phase, during which a player can create, remove, move, or otherwise arrange and/or edit defensive lines to define lines of battle in a party, and then the player may arbitrarily place each character in the party within a line of battle defined by the defensive lines. The video game may then graphically depict the party during battle in the formation established by the player, however, the defensive lines need not be continuously displayed during game play. The video game may set limits on the number of defensive lines or lines of battle, and may also set limits on the number or percentage of a party's characters that can occupy a single line of battle when multiple lines of battle exist, thereby forcing players to make strategic decisions as to which characters to place in which lines of battle. Those of skill in the art will appreciate that any representation of lines of battle as spatially separate groups, with or without defensive lines, may be used.

As indicated above, while a character automatically attempts to defend other characters in more rearward lines of battle, the defense might not always be successful. For example, a blocking ratio, referred to as a guard condition (GC) value, may be used to determine whether a defense is successful. If successful, the defensive action by a front guard character may defend the rear guard character against melee, range and magic attacks, or only against a subset of such attacks, as desired by the game designers. Melee, range, and magic type attacks, in general, are well known in the art. If an enemy attacks a character in the front line of battle (i.e., a front guard character), then that front guard character is left to defend itself as otherwise dictated by the game's control logic. A player can increase the likelihood of blocking an enemy attack on a rear guard character by placing more characters in the front line of battle, as further described below.

An indication of the GC value may optionally be graphically depicted on the video game display device to illustrate to a player the likelihood of success of blocking an enemy's attack. In addition, the GC value may fluctuate depending on actions performed during the game. For example, as a character becomes weaker (e.g., its health lessens, or some other attribute is negatively affected), that character might have a lesser likelihood of successfully blocking an enemy attack (have a lower GC value). GC values may also decrease as a result of negative spells, potions, or other penalties (temporary or permanent) applied to a character. On the other hand, the GC value of a character might increase as the character gains strength (or some other attribute increases, such as character level), or as a result of positive spells, potions, or other rewards (temporary or permanent) applied to a character. The use of spells, potions, and other rewards and penalties to temporarily affect skills, attributes, and the like are known in the art. The GC value may be calculated per character, per party, or per line of battle.

For example, with reference back to FIG. 6, according to an illustrative feature, the GC value may be calculated during battle as follows. At the start of combat, the GC value may be established according to Equation 1, where $GC_B$ is the starting GC value for use in determining if an attack is blocked, $GC_P$ is a base GC value assigned to the defending party, and $GC_F$ is the total of all individual GC values ($GC_I$) for characters in the defending front line. $GC_F$ may also be calculated as shown in Equation 2 as the sum of $GC_{I1}, \ldots, GC_{In}$, where 1 ... n correspond to front guard characters.

$$GC_B = GC_P + GC_F \qquad \text{Equation 1}$$

$$GC_F = GC_{I1} + \ldots + GC_{In} \qquad \text{Equation 2}$$

$GC_P$ may be assigned per party regardless of its formation, or may alternatively be based on the number of characters in a party and/or the types of characters in the party. A $GC_P$ value of 0.3, or 30%, may be used as an example. The individual GC value for each character, $GC_I$, may be based on attributes of each character. For example, $GC_I$ might be based on a level of the character plus a modifier based the character's equipment, attributes, and/or skills. Further modifiers may be used in determining a character's $GC_I$ value, such as a compensation value that is preset for each character to increase or decrease the $GC_I$ value. $GC_I$ values around 0.1, or 10%, have been found to provide a high level of strategic game play, but $GC_I$ values are not limited in this regard. As is evident from Equation 2, the more characters in the front line of battle, the higher the value of $GC_F$.

According to an illustrative aspect of the invention, GC values may be relative to each other. For example, characters may incur an initial $GC_I$ value of about 20 GC points, and the $GC_I$ value may fluctuate plus/minus some value, say up to 10, based on each character's attributes (e.g., strength, intelligence, constitution, etc.), thereby providing characters with low GC abilities having as little as 10 GC points, and characters with high GC abilities having up to 30 GC points. When two characters with high GC ability are on the front line, then the cumulative GC points may be about 60 (optionally, the GC value of the player party may be added as well, as described herein). Each characters GC value may also fluctuate based on character skills which may affect the GC value. For example, a character may enhance his or her melee defense, range defense, or other defense skill (or non-defensive skill if applicable), thereby providing a permanent modifier to his or her GC value. Each modifier may be a predetermined number of GC points (e.g., 10, 50, etc.) or may be a relative modifier on the $GC_I$ value (e.g., +10%, ×1.5, etc.). GC values may further be affected by temporary modifiers resulting from spells, potions, special objects, and the like. Thus, if a character has a high $GC_I$ value based on his or her attributes, and the character has enhanced his or her skills that affect GC values, and the character has a positive affecting temporary modifier in effect, GC values for the single character may be approximately 250 GC points. According to an aspect of the invention, a party's $GC_C$ value (described below) may be capped at some number, e.g., 999.

Once combat has begun, the current GC value, $GC_C$, may fluctuate according to various criteria, events, and/or actions. $GC_C$ may be calculated according to Equation 3 or Equation 4, where V is a variable based on one or more criteria, events, and/actions occurring during the battle.

$$GC_C = GC_B + V \qquad \text{Equation 3}$$

$$GC_C = GC_P + GC_{I1} + \ldots + GC_{In} + V \qquad \text{Equation 4}$$

Equation 1 is equal to Equation 3 when V=0. Equation 3 is equivalent to Equation 4, where Equation 4 is expanded to show all variables on which $GC_C$ is based. The value V may fluctuate during battle, e.g., based on successful attacks by enemies and successful blocks of enemy attacks. Because $GC_C$ is based on $GC_F$, which is based on $GC_I$ values of each character in the front line, the value $GC_C$ may be recalculated at regular intervals or upon the occurrence of any event that would affect the $GC_C$ value. While Equations 14 illustrate additive formulas for calculating $GC_C$, other formulas with multiplicative, exponential, logarithmic, and other mathematical modifiers may be used as well, depending on the game play desired.

According to an illustrative feature, because the $GC_B$ value is dependant on $GC_I$ values, the GCS battle system may recalculate $GC_C$ whenever the formation of the party has changed, e.g., when a front guard character gets killed or incapacitated ($GC_I$ values of killed or incapacitated characters might not be included in $GC_C$), when a front guard character gets resurrected or resuscitated ($GC_I$ values added back in to $GC_I$), when a front guard character moves to the rear line of battle, when a character from the rear line of battle moves to the front line of battle, or when a front guard character moves to the forefront (explained below).

In addition to fluctuation based on $GC_I$ values, $GC_C$ may also fluctuate based on V. V may actually represent one or more variables, and is not limited to a single variable. For example, V may be calculated as a function of enemy attacks, fluctuation of characters skills and equipment, or other criteria as desired. For example, the value V may decrease when an enemy successfully attacks, thereby resulting in even more successful enemy attacks in the future unless appropriate action is taken by the attacked player. V may also be affected by a change in a character's skills/attributes or equipment during a battle, e.g., as a result of damage or due to a penalty or reward (such as a potion, spell, or the like), if not already taken into account in that character's $GC_I$ value. The amount that the variable V increases/decreases due to an enemy attack or successful defense may be preset for each different type of attack, e.g., regular attack, magic attack, critical attack, and the like. The dynamic fluctuation of V causes players to behave strategically in response to the fluctuating value of $GC_C$. For example, a decreasing $GC_C$ value as a result of successful enemy attacks may cause a player to use a potion or cast a spell to rehabilitate the current $GC_C$ value.

The $GC_C$ value may further be affected by other factors as well. For example, a character might have or develop a skill that allows her to prevent her $GC_I$ value from decreasing for some predetermined amount of time when she is successfully physically (or magically) attacked, or until she receives a certain number of successful attacks or damage. Similarly, a temporary penalty or reward, such as a potion or spell, may also affect the $GC_I$ for a character, or even the $GC_P$ value for an entire party. If the effect is permanent, the effect may be taken into account in the $GC_I$ or $GC_P$ value, as appropriate. If the effect is temporary, the effect may be taken into account in the value V. The GCS system may recalculate the $GC_C$ value as often as necessary to maintain an accurate $GC_C$ value. The value of $GC_C$ preferably has a maximum allowed value, e.g., 0.8, or 80%, 999, etc.

In addition, front guard characters may perform special defensive actions, which act to increase the $GC_C$ value, for example, by temporarily increasing the value V. Special defensive actions may include, for example, the character performing an explicit defensive maneuver or casting a defensive spell instead of attacking an enemy character. The amount the special defensive action affects the value V, and thus affects $GC_C$, may depend on the type of special action performed, as each special defensive action may be associated with a different modifier. The effect of the special defensive action on $GC_C$ may last for the duration of the special defensive action, or some other amount of time as specified in the GCS control logic. Optionally, the GCS may allow the $GC_C$ value to temporarily go above the maximum allowed value as a result of special defensive actions.

Figure 10:
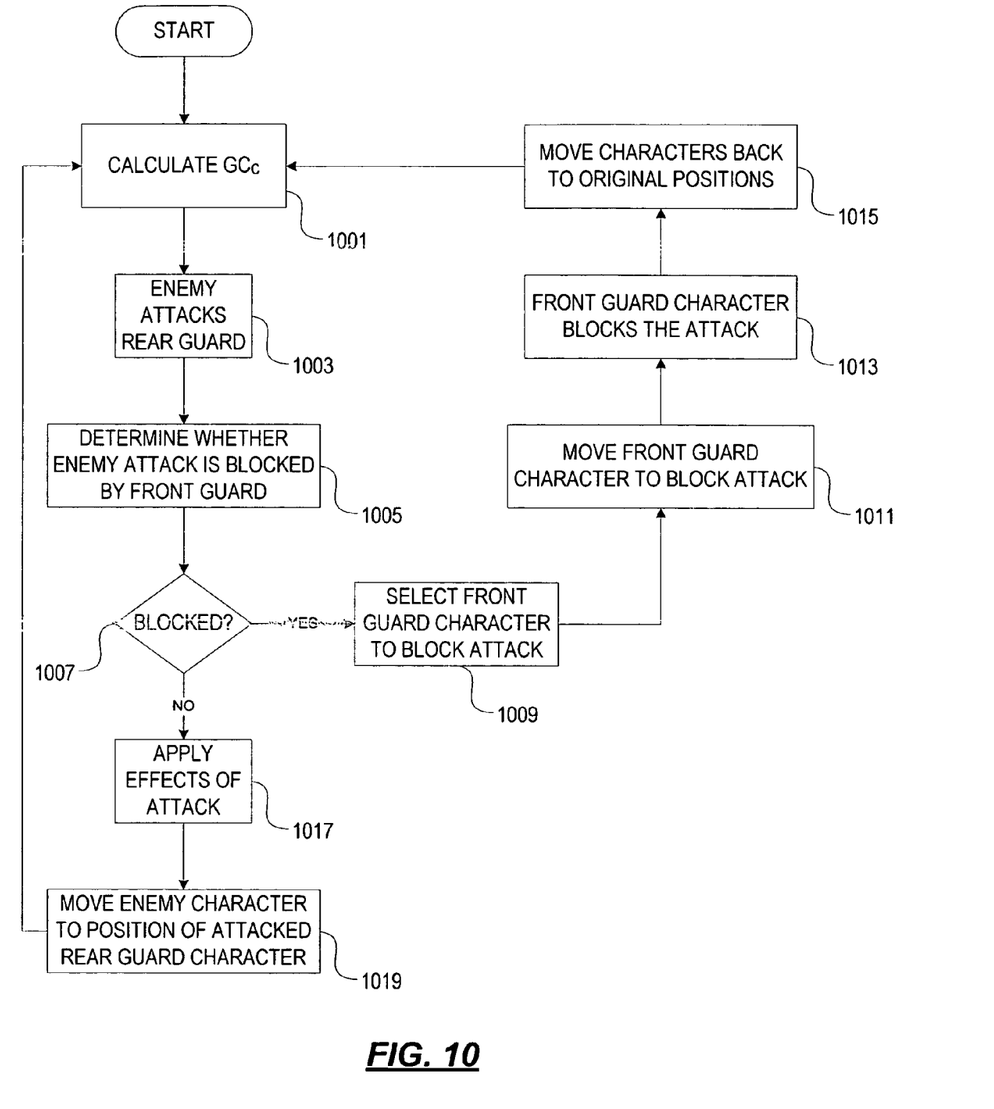
FIG. 10 illustrates a flowchart for a method of determining whether to block an attack according to an illustrative feature described herein.

FIG. 10 illustrates a method for determining whether to block an enemy attack in an entertainment or video game according to one or more illustrative features described herein, where the defending party has two lines of battle. In step 1001, the GCS battle system calculates the current GC value, $GC_C$, which will be used to determine whether any enemy attacks on a rear guard character are blocked by a front guard character. In step 1003, an enemy character launches an attack on a rear guard player character, e.g., as illustrates in FIG. 8. In steps 1005 and 1007, the GCS determines whether the front guard player character will successfully block the attack by the enemy character, based on the $GC_C$ value determined in step 1001. If the attack is successfully blocked, then in step 1009 the GCS picks a front guard character to perform the blocking action. The GCS battle system selects a front guard character because the $GC_C$ value is based on the entire front line of battle. The GCS thus selects a specific front guard character to graphically depict as performing the blocking action on the video game display device. In steps 1011 and 1013 the GCS causes the video game to graphically depict the chosen front guard character moving to block the attack, and subsequently blocking the enemy attack. In step 1015 the GCS graphically depicts the characters as moving back to their respective original positions after the block has ended. The method then returns to step 1001 to recalculate the $GC_C$ value based on the successful block/unsuccessful attack.

If in step 1007 the GCS determines that the front guard's blocking of the attack was unsuccessful, then in step 1017 the GCS causes the video game to apply the effects of the attack. For example, the effects may include a graphical depiction of the attack on the video game display device, altering one or more attributes of the attacking character and the attacked character, and the like. In step 1019 the GCS may optionally cause the enemy character that performed the attack to remain at a position nearby the attacked character, i.e., behind the defensive line and in the same line of battle as the attacked character. The GCS then returns to step 1001 to recalculate the $GC_C$ value based on the successful block/unsuccessful attack.

Those of skill in the art will appreciate that the recited steps may be performed in other than the recited order, that some steps may be optional, that some steps may be broken into multiple steps, and that multiple steps may be combined into a single step. For example, step 1019 may be optional. According to an illustrative feature, when step 1019 is included, an enemy character that successfully attacks a rear guard character may remain at or near the location of the rear guard character, such that future attacks by that enemy character on rear guard characters are not subject to blocking by player characters on a more forward line of battle. That is, in this embodiment, blocking only occurs if there is a line of battle between the enemy character and the character being attacked.

The method of FIG. 10 applies likewise to player character attacks on enemy rear guards. In the embodiment utilizing step 1019, when an attacking character remains at the location of the attacked rear guard character, the attacking character is said to be at the forefront of the battle area, and that attacking character is removed from $GC_C$ calculations (e.g., the $GC_I$ of that character is not included as long as the character remains at the forefront). That is, a character in the midst of enemy territory cannot aid in defending his own rear guard from enemy attacks. Thus, players need to act strategically to determine whether to direct attacks at rear guard enemy characters, thereby removing one of the player's characters from being able to defend against enemy attacks, because once in the forefront, characters might not be able to return to their original line of battle.

According to another illustrative feature, when a character is in the forefront and attacks a front guard enemy character (not a rear guard enemy character), the attacking character may return to its own original position in its own front or rear line of battle, as appropriate. This is because, conceptually, the attacking character moves to the enemy front line of battle, and there is thus a line of battle between the attacking character and the enemy rear guard characters. Any subsequent attack on the enemy rear guard is thus subject to blocking as described herein. If the attacking character returns to the front line of battle of her party, then that character's $GC_I$ value may again be included in $GC_C$ calculations.

As discussed above, front guard characters may block both physical and magical attacks by enemy characters. However, according to an illustrative feature, blocks against magic attacks might incur a different result than as against physical attacks. When an enemy character casts a spell or other magic attack, the GCS battle system may optionally redirect the spell at any character in the player party depending on the $GC_C$ value. When the $GC_C$ value is relatively high (e.g., greater than the $GC_B$ value), the spell may be directed at a front guard character. When the $GC_C$ value is relatively low (e.g., lower than the $GC_B$ value), the spell may be directed at a rear guard character. The GCS picks a character from the appropriate line of battle and applies the magical attack to the selected character. The GCS battle system may optionally maintain a separate magic guard condition (MGC) value, in addition to the $GC_C$ value, for determining results of magic attacks. Players may control the MGC value similarly to the GC value, e.g., through attributes, potions, spells, etc.

Figure 11:
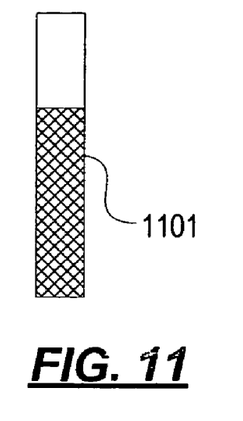
FIG. 11 illustrates a vertical guard condition meter according to an illustrative feature described herein.
Figure 12:
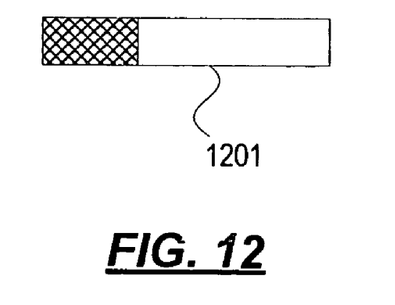
FIG. 12 illustrates a horizontal guard condition meter according to an illustrative feature described herein.
Figure 13:
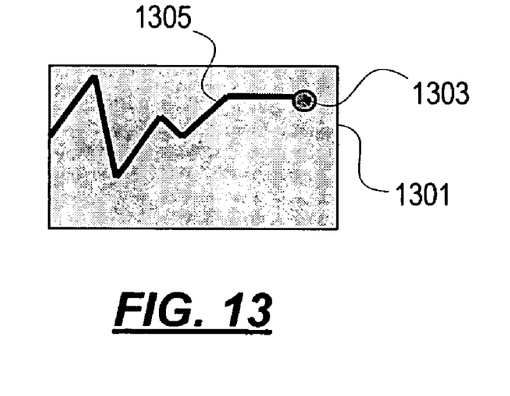
FIG. 13 illustrates a guard condition display according to an illustrative feature described herein.

As indicated above, the GCS may graphically depict a representation of the current GC and/or MGC value on the video game display device, thus providing players an indication of the GC and/or MGC value, and allowing players to make strategic decisions regarding casting spells, using potions, etc., that affect the GC and/or MGC value. The visual representation may include a numerical expression, such as 0.3, 80%, 4/10, etc. Alternatively, the GCS may depict a vertical meter 1101 such as is illustrated in FIG. 11 or a horizontal meter 1201 such as is illustrated in FIG. 12. Alternatively, the GCS may provide a graphical depiction that includes a history of the GC and/or MGC value, such as a line graph similar to the graph 1301 illustrated in FIG. 13, with an indicator 1305 of the current GC value, and history indicator 1307 showing how the GC and/or MGC value has changed over time.

According to various illustrative aspects of the invention, the GCS may be included in either single-player or multi-player games. Those of skill in the art will appreciate that various inputs and mechanisms may be used to control character action and placement within the battle party. The present invention includes any novel feature or combination of features disclosed herein either explicitly or any generalization thereof. While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. One or more computer storage devices storing computer-executable instructions for performing a battle system method in an entertainment game, wherein the instructions, when executed by a processor, cause the processor to perform the steps of the battle system method, comprising:

establishing a forward line of battle and a rearward line of battle within a multi-character party in the entertainment game, wherein the forward line of battle is in front of the rearward line of battle with respect to an second party, and wherein each line of battle comprises at least one character of the multi-character party;

determining when an attacking character from the second party has directed an attack at a first character of the rearward line of battle; and when it is determined that the attacking character has directed the attack, automatically attempting to perform a block of the attack using the one or more characters comprising the forward line of battle by:

establishing a guard condition value based on a value of at least one attribute of each of a plurality of the characters of the multi-character party;

determining, based on the guard condition value, whether the block of the attack is to be successful;

when the block of the attack is determined to be successful, subsequently selecting a blocking character from the one or more characters comprising the forward line of battle to perform the block of the attack; and performing the block of the attack by the attacking character from the second party using the selected blocking character.

2. The computer storage devices of claim 1, wherein the selecting step comprises graphically depicting on a video game display device the blocking character blocking the attack by the attacking character.

3. The computer storage devices of claim 1, the method further comprising: when the automatically attempting step is unsuccessful, graphically depicting the attacking character moving to a position in proximity with the first character and remaining in said position, such that subsequent attacks by the attacking character on the first character are not subject to attempted blocking by the one or more characters comprising the forward line of battle.

4. The computer storage devices of claim 1, wherein the entertainment game comprises a video game.

5. The computer storage devices of claim 1, wherein the guard condition value is based on at least one attribute of every character of the multi-character party.

6. The computer storage devices of claim 5, wherein the automatically attempting step further comprises, prior to determining whether the attack is blocked, adjusting the guard condition value based on the at least one attribute of one or more characters in the forward line of battle.

7. The computer storage devices of claim 5, wherein the automatically attempting step further comprises, prior to determining whether the attack is blocked, adjusting the guard condition value based on a result of a previous attack against the multi-character party.

8. The computer storage devices of claim 5, wherein the automatically attempting step further comprises, prior to determining whether the attack is blocked, adjusting the guard condition value based on a temporary modifier.

9. The computer storage devices of claim 8, wherein the temporary modifier comprises a reward that increases a likelihood of blocking the attack.

10. The computer storage devices of claim 8, wherein the temporary modifier comprises a penalty that decreases a likelihood of blocking the attack.

11. The computer storage devices of claim 5, the method further comprising graphically depicting an indication of the guard condition value on a video game display device during the performance of the battle system.

12. The computer storage devices of claim 11, wherein the indication of the guard condition value comprises a historical value and a current value of the guard condition value.

13. One or more computer storage devices storing computer-executable instructions for performing a battle system method in a video game, wherein the instructions, when executed by a processor, cause the processor to perform the steps of the battle system method, comprising:
  receiving first user input defining a plurality of ordered lines of battle;
  receiving second user input identifying one or more characters of a multi-character player party to be placed within a first line of battle of the plurality of lines of battle;
  receiving third user input identifying one or more characters of the multi-character player party to be placed within a second line of battle of the plurality of lines of battle, wherein the second line of battle is behind the first line of battle in the plurality of ordered lines of battle, and wherein each character is located in only one line of battle;
  the one or more characters of the first line of battle automatically attempting to block an attack by an enemy character against an attacked character of the one or more characters of the second line of battle by:
  establishing a guard condition value based on a value of one or more attributes of each of a plurality of characters of the multi-character party;
  determining, based on the guard condition value, whether the block of the attack is to be successful;
  when the block of the attack is determined to be subsequently selecting a first character from the first line of battle to perform the block of the attack; and
  performing the block of the attack by the enemy character using the selected first character.

14. The computer storage devices of claim 13, the method further comprising, when the attack is unsuccessfully blocked, graphically depicting the enemy character moving to a position in proximity with the attacked character and remaining in said position, such that subsequent attacks by the enemy character on the attacked character are not subject to attempted blocking by the one or more characters of the first line of battle.

15. The computer storage devices of claim 13, wherein the plurality of ordered lines of battle consist of two lines of battle.

16. The computer storage devices of claim 13, wherein the automatically attempting step comprises: adjusting the guard condition value based on values of the attributes of one or more characters in the first line of battle; adjusting the guard condition value based on a result of a previous attack against the multi-character party; adjusting the guard condition value based on a temporary modifier; and determining whether the attack is blocked based on the adjusted guard condition value.

17. One or more storage devices media storing computer-executable instructions for performing a turn-based battle system method in a video game, wherein in the video game a player controls a multi-character first party arranged in a plurality of ordered lines of battle including a first line of battle and a second line of battle behind the first line of battle, where each first party character is located in one of said plurality of ordered lines of battle, wherein the turn-based battle comprises a series of consecutive battle rounds occurring between the player party and a second party comprised of one or more enemy characters, wherein during at least one of the battle rounds the characters of the first party and second party perform attacking and defending actions against each other, respectively, wherein the attacking and defending actions performed by the characters are performed during consecutive turns of the turn-based battle system in a predetermined order, wherein each battle round consists of one or more turns, wherein the instructions, when executed by a processor, cause the processor to perform the steps of the battle system method, comprising:
  determining that an attacking character of the second party has directed a first attacking action on a first party character located on the second line of battle during a first battle turn;
  in response to the determining step, determining whether a defending action to be performed by one or more first party characters located in the first line of battle in response to the first attacking action is to be successful, irrespective of which of the plurality of the characters of the forward line of battle ultimately performs the defending action;
  when the defending action is determined to be successful, subsequently selecting the one or more first party characters located in the first line of battle during the first battle turn to perform the defending action; and
  when the attacking action is successful, moving the attacking character to a position in proximity with the second line of battle, whereby the attacking character remains in said position during subsequent battle turns such that any subsequent attacks by the attacking character on the first party character during battle turns subsequent to the first battle turn are not subject to further defending actions performed by the one or more first party characters located in the first line of battle.

18. The computer storage devices of claim 17, wherein the performing step comprises the one or more characters of the first line of battle automatically attempting to block the attack by the attacking character.

19. A method for performing a turn-based battle system in an entertainment game played by a player on a data processing device, wherein said data processing device performs the turn-based battle system including the steps of:
- establishing a first party comprising two or more player-controlled characters;
- establishing a series of consecutive battle rounds occurring between the first party and a second party comprised of one or more enemy characters, wherein during at least one of the battle rounds the characters of the first party and second party perform attacking and defending actions against each other, respectively, wherein the attacking and defending actions performed by the characters are performed during consecutive turns of the turn-based battle system in a predetermined order, wherein each battle round consists of one or more turns;
- establishing, for at least the first party, a forward line of battle and a rearward line of battle, wherein the forward line of battle is in front of the rearward line of battle with respect to the second party, and wherein each line of battle comprises at least one character of the first party;
- determining by said processing device, for a particular battle round, whether an attacking character from the second party has directed an attacking action at a first character of the rearward line of battle of the first party;
- establishing a guard condition value corresponding to at least one attribute of each of a plurality of the characters of the first party and adjusted according to at least one attribute of at least one character in the forward line of battle;
- in response to a determination that the attacking character from the second party has directed an attacking action at the first character,
- automatically determining based on said guard condition value, whether the attacking action will be successfully blocked by a defending action to be performed by one or more characters comprising the forward line of battle;
- when it is determined that the attacking action will be successfully blocked, subsequently selecting which of the one or more characters will perform the defending action; and
- performing the defending action using the character selected to perform the defending action.

20. The method according to claim 19, wherein the guard condition value is further adjusted based on at least one of the following:
- a formation change of the first party wherein one or more characters in the first party move from the forward line of battle to the rearward line of battle, or vice versa;
- one or more characters in the forward line of battle are killed or incapacitated;
- one or more characters in the forward line of battle are resurrected or resuscitated;
- one or more characters of the first or second party uses a particular offensive or defensive skill which affects the guard condition value;
- an attribute of one or more characters of the first party is temporarily modified;
- an attacking action of an enemy character is successfully blocked by a defending action performed by a character of the forward line of battle; and
- an attacking action is successfully performed against a character of the first party.

21. The method according to claim 19, wherein if the attacking action is successfully performed against the first character, the attacking character is moved past the forward line of battle to be in proximity to the rearward line of battle, whereby further attacks performed by the attacking character against characters in the rearward line of battle are prevented from being blocked by a defending action of a character in the forward line of battle as long as the attacking character remains in proximity to the rearward line of battle.

* * * * *